United States Patent Office
3,583,874
Patented June 8, 1971

3,583,874
NOVEL INSTANT PUDDING STARCH AND
PROCESS FOR PREPARING SAME
Felix Germino, Palos Park, and Ronald S. Golik, Franklin Park, Ill., assignors to CPC International Inc.
No Drawing. Filed May 31, 1968, Ser. No. 733,321
Int. Cl. A23l 1/14
U.S. Cl. 99—139    13 Claims

ABSTRACT OF THE DISCLOSURE

A starch composition suitable as the thickening and gelling agent in the formulation of instant puddings which comprises a blend of (1) a cold-water dispersible starch, the granules of which are substantially completely intact and substantially completely non-birefringent, and which is further characterized by having a fluidity of from about 15 to about 25, and (2) a pregelatinized starch derived from an amylose-containing starch which has a fluidity of from about 5 to about 16 and a bound fat content of less than about 0.3%.

---

This invention relates to an improved starch composition suitable for the preparation of instant puddings. By the term "instant pudding" is meant a dry, packaged pudding composition which is prepared for consumption by merely adding cold milk to the pudding base, agitating (with an egg beater or the like), and allowing it to stand for 5 to 10 minutes. Instant puddings have been on the market for a number of years. They generally consist of pregelatinized (i.e. cold-water dispersible) starch, one or more setting agents which are usually phosphate salts, plus flavoring and coloring agents. The "set" or gel characteristics of these puddings are produced by the interaction of the phosphate salts with the protein of the milk, and not from the starch portion of the composition. The pregelatinized starch functions as a viscosity builder or thickening agent, but does not contribute to the gel structure of the prepared pudding.

Conventional starch-based puddings generally comprise an ungelatinized starch plus flavorings, etc. These are prepared for consumption by adding milk, cooking (with almost constant stirring) until the starch has gelatinized, pouring the pudding into a bowl or individual serving dishes, and cooling and/or refrigerating.

The texture, appearance and taste of the prepared instant puddings are quite different from those of the conventional cooked puddings. The cooked puddings are characterized by firm gel structures and very smooth textures. When a spoon is inserted the pudding "cuts" cleanly and maintains its shape. In appearance and mouthing characteristics the texture of the gel is extremely smooth. The instant puddings, on the other hand, do not have the firm gel structure of the cooked puddings. They do not cut as cleanly with a spoon, and their texture, rather than being smooth, is generally described as "grainy," both from the standpoint of appearance and mouthing characteristics. Furthermore, the flavor of the instant puddings is generally inferior to that of the cooked puddings, due to the presence of the phosphate salts. The instant puddings are also characterized by rapid syneresis, i.e. they lose water after standing for a few hours.

For the aforementioned reasons, the instant puddings on the market have not gained the consumer acceptance of the conventional puddings in spite of their comparative simplicity and speed of preparation.

We have discovered a starch composition for use as a base for instant puddings which will produce a finished pudding having the texture, appearance, gel structure and flavor of a cooked starch pudding.

It is an object of the present invention to prepare a starch composition which, when mixed with a cold liquid such as milk, will produce a pudding having the texture, gel structure and appearance of a cooked starch pudding.

Another object is to prepare a pudding base which will reconstitute in cold milk to produce a pudding having a firm gel structure, smooth, full bodied texture, attractive appearance and excellent flavor.

A further object is to prepare a starch composition for a packaged pudding which can be prepared for consumption in a rapid and simple manner.

Other objects and advantages will appear hereinafter.

The novel starch composition of the instant invention comprises a blend of two starches, which will be fully described hereinafter, and which we shall designate as (1) a pregelatinized defatted starch having a fluidity of from about 5 to about 16, and (2) a granular preswollen starch having a fluidity of from about 15 to about 25 and preferably about 20.

DESCRIPTION OF THE PREGELATINIZED DEFATTED STARCH COMPONENT

By the term "defatted starch" is meant an amylose-containing starch, the bound fat content of which has been reduced to less than about 0.3% and preferably not more than about 0.15% (percentages by weight, based on the total weight of the starch). Any amylose-containing starch can be employed, although the amylose-containing cereal starches such as corn starch, are preferred. The waxy starches, on the other hand, i.e. those starches which consist entirely or substantially entirely of amylopectin, are not suitable. Amylose-containing starches generally contain between about 0.5% and 0.8% of bound fat; corn starch, for example, contains about 0.6% bound fat. Various methods are known to the art for removing the major portion of this bound fat, i.e., for "defatting" starch. Several of these methods comprise extracting starch with suitable solvents for the fat, such as methanol, ethanol, isopropyl alcohol, diethylene glycol, monobutyl ether, acetone, dioxane, etc. The extraction may take place in the presence or absence of water, and at room temperature or elevated temperatures. U.S. Pats. 2,280,723, Schoch, and 2,587,650, Rist and Wolff, describe suitable methods for defatting starch by means of solvent extraction.

Another method, which avoids the use of solvents, is as follows. A hot aqueous solution (i.e. paste) of starch is contacted with a water-insoluble fat-sorbent filter aid, such as diatomaceous earth or bentonite, after which the filter aid is separated from the hot starch solution. As will be more fully discussed below, another requirement of the defatted starch component is that it be pregelatinized by instantaneously removing the water from a paste of the starch. If the just-described "filter aid" method is employed for the defatting step, then the hot paste can be fed to a suitable drying apparatus immediately after removal of the filter aid.

The particular method employed for defatting the starch is immaterial, the only necessary qualification being that the resulting starch have a bound fat content of less than about 0.3%, and preferably not more than 0.15%.

In addition to the reduction of the fat content, the starch should be pregelatinized, i.e. rendered cold-water dispersible, by first pasting in water and then instantaneously removing the water from the starch paste. Any drying apparatus capable of instantaneously drying a starch paste, such as a roll-dryer, spray-dryer, foam mat-dryer or belt-dryer, can be employed.

Another necessary requirement of the defatted starch component is that it have a fluidity of from about 5 to about 16, and preferably about 8. The fluidity can be adjusted by any known means, as by treatment with acid or the like.

Fluidity is measured by the method of Buel, 8th Intern. Congr. Pure Applied Chem., Orig. Comm., 13, 63 (1912). Following is a brief description of the method.

The instrument employed consists of an ordinary glass funnel with the stem cut short and a glass tip connected with a piece of rubber tubing. The tip is made so that the instrument will deliver about 105 cc. of water in about 70 seconds. The individual instruments are calibrated against a standard instrument.

Five grams of starch is weighed into a 250 cc. beaker and brought into suspension with 10 cc. water; then 90 cc. of a 1% sodium hydroxide solution, of 25° C., is added and the whole stirred for 3 minutes at the rate of 70 to 80 r.p.m. The beaker is then placed in a water bath, in which a constant temperature of 25° C. is maintained, for 30 minutes. About 20 seconds before the expiration of the full 30 minutes the beaker is removed and the starch paste is poured into the instrument. At the expiration of the 30 minutes a 100 cc. graduated cylinder is brought under the delivery point. At the end of 70 seconds the graduated cylinder is removed, and the reading in cc. represents the observed fluidity. This observed fluidity is then corrected by reference to the calibration curve for the individual instrument, and the corrected value reported.

In the preparation of the defatted starch component the steps of defatting, pregelatinizing (i.e. instantaneously drying a paste), and fluidity adjustment can be performed in any order. For example, a granular, thick boiling starch, such as corn starch, can be first defatted, then acid treated to the desired fluidity, and finally pregelatinized; it can be defatted and acid modified simultaneously, either before or after the pregelatinizing; etc. As was stated previously, if the "filter aid" method of defatting is used, the hot paste should be fed to a dryer for the pregelatinizing step shortly after removal of the filter aid, which contains the fat absorbed thereon, from the hot paste.

The critical requirements of the defatted starch component can be summarized as follows:

(1) It must be derived from an amylose-containing starch, and preferably from an amylose-containing cereal starch;

(2) It must have a bound fat content of less than 0.3%, and preferably not more than 0.15%;

(3) It must be pregelatinized by instantaneously removing moisture from a paste of the starch;

(4) It must have a fluidity of from about 5 to about 16, and preferably about 8.

DESCRIPTION OF THE GRANULAR PRESWOLLEN STARCH COMPONENT

By the term "granular preswollen starch" is meant a starch the granules of which are (1) substantially completely intact and (2) substantially non-birefringent (i.e. no characteristic maltese crosses are evident when the starch is viewed under a polarizing miscroscope). A starch having the aforementioned structural characteristics will have the property of rapidly dispersing in cold water to form a paste, which paste will increase in viscosity when subjected to shear (as contrasted with the pastes formed from conventional cold-water dispersible starches which decrease in viscosity when subjected to shear). A suitable method for the preparation of a granular preswollen starch is as follows.

Granular (i.e. non-gelatinized) starch is slurried with (1) a solvent for starch, i.e. a liquid in which starch will gelatinize, and (2) an organic liquid which is not a solvent for starch, and which is miscible with the solvent for starch. The resultant slurry is then placed in a confined zone, wherein it is subjected to gelatinizing conditions. The process conditions are so selected as to produce the desired end product. For reasons of economy and availability, water is the preferred solvent for starch, although other known starch solvents such as dimethyl sulfoxide may be used. As the organic liquid low molecular weight alcohols, ketones, dioxane, or the like are preferred. Mathanol is particularly suitable because of its low cost and because it can be readily removed from the starch after treatment.

An example of preparing the granular preswollen starch by the above-described method follows. A slurry consisting of 20% granular corn starch, 30% water and 50% methanol (percentages by weight, based on the total weight of the slurry) is made up, and is passed continuously through a jacketed, tubular heat exchanger, wherein the slurry is subjected to a temperature of about 280° F. for a period of about 2 minutes. After treatment the slurry is rapidly cooled, for example by discharging it from the heat exchanger directly into a tank of methanol; the treated starch is then filtered out of the slurry, washed with additional methanol, and dried. As will be more fully explained hereinafter, any excess, entrained methanol is also removed from the treated starch in order to make it suitable for use in a pudding.

Another suitable method for preparing the granular preswollen starch component is to pregelatinize a slightly inhibited starch, i.e. one which has been lightly cross-linked with a suitable cross-linking agent such as an epihalohydrin, phosphorus oxychloride, or the like. The specific method of preparing the granular preswollen starch is immaterial, so long as a starch having the required structural characteristics is obtained.

The granular preswollen starch component of the invention should have a fluidity of from about 15 to about 25 and preferably about 20. As in the case of the defatted starch component, the fluidity adjustment can be performed by any known method, as by treatment with acid, enzymes, or the like. Furthermore, the fluidity adjustment can be performed before or after or simultaneously with the preparation of the granular preswollen starch.

It is also desirable, although not necessary, to lower the bound fat content of the granular preswollen starch to less than about 0.3% and preferably to not more than about 0.15%, because puddings of slightly improved taste result when both starch components have a low fat content. Certain methods of preparing this component, such as the method first described involving the use of a solvent for starch and an organic liquid, will simultaneously defat the starch. Other methods, such as second-described method involving pregelatinizing a slightly cross-linked starch, will have no effect upon the fat content; if such a preparation method is employed, it is desirable to add a defatting step somewhere in the overall process.

The essential requirements of the granular preswollen starch component can be summarized as follows:

(1) Structurally, the starch should be composed of substantially 100% completely intact, but non-birefringent, granules, and (2) It should have a fluidity of from about 15 to about 25, and preferably about 20.

REMOVAL OF ANY ORGANIC LIQUID FROM THE STARCH COMPONENTS

Frequently, when starch has undergone a treatment with a low molecular weight organic liquid such as methanol at elevated temperature the treated starch retains a fairly large amount of the organic liquid. If the preparation of either or both of the starch components of the present invention includes such a treatment, the starch or starches will retain quite a bit of the organic liquid. Obviously, this must be removed if the starch is to be used in a foodstuff such as a pudding. Any suitable method can be employed to remove excess organic liquid from the starch components of our invention, but we shall present one such method which we have found to be particularly efficient. It should be noted that this method is applicable to the removal of excess organic liquids from both the defatted starch component and the granular preswollen starch component.

The treated starch is first recovered from the treatment liquid, as by filtration or centrifugation, and the moisture level is brought to a level of from about 1% to about 15%, by weight based on the weight of the starch plus the moisture. The starch is then contacted with a hot humid gas, preferably moist air or steam, while it (the starch) is maintained at a temperature of from about 160° F. to about 320° F., for a time sufficient to reduce the organic liquid to an acceptable level.

PROPORTIONS OF THE STARCH COMPONENTS

The granular preswollen starch component should be present in an amount of from about 20% to about 90%, by weight, based on the total weight of the starch blend. The defatted starch should be present in an amount of from about 80% to about 10%. The preferred portions are about 60% granular preswollen starch and about 40% defatted starch. As will be seen from the examples, a composition comprising 60% granular preswollen starch having a fluidity of 20, and 40% defatted starch having a fluidity of 8, will reconstitute to form a pudding which is practically indistinguishable from a cooked starch pudding.

The following examples will illustrate the practice of the invention. They are presented for illustrative purposes only and should not be considered as limiting the invention in any way.

EXAMPLE I

Blends of defatted corn starches (all having a bound fat content of about 0.1%) and granular preswollen corn starches, of various fluidities, were prepared. The granular preswollen starch was prepared by treating corn starch with water and methanol (the slurry comprised 20% starch, 30% water and 50% methanol) at 280° F., as was described earlier in the specification. The resultant starches contained about 0.1% bound fat. Pudding bases were then prepared using the following formulation:

|  | Grams |
|---|---|
| Starch | 12.0 |
| Sucrose | 20.6 |
| Vanilla | 0.9 |
| Color | 0.5 |
| Salt | 0.5 |
| Total | 34.5 |

The pudding bases were poured into 118 milliliters of milk (at 4° C.), and the mixture was stirred vigorously for one minute and then allowed to set at room temperature for 15 minutes. Also, an instant pudding and a cooked starch pudding were prepared with commercially available products according to package directions.

In addition, several puddings were prepared employing gelling and thickening agents other than blends of the two starch components of the instant invention. In Table I, wherein the various compositions are tabulated, these puddings and the two commercial products are listed under the heading "A. Control Samples." The various granular preswollen starch-defatted starch blends are listed under the heading "B. Experimental Samples."

The puddings were compared with the commercial products and rated according to appearance, texture, gel strength, and mouthing characteristics. These ratings appear in Table I under the sub-heading "Comments on Puddings."

TABLE I

A. Control Samples

| Sample Number | Component (a) | Grams of Component (a) | Component (b) | Grams of Component (b) | Comments on puddings |
|---|---|---|---|---|---|
| 1 | Cooked pudding (commercial brand). | | | | Firm gel structure, very smooth texture, excellent overall appearance. |
| 2 | Instant pudding (commercial brand). | | | | Thick, no firm gel structure, grainy texture, good overall appearance. |
| 3 | Guar gum | 4.0 | | | Very thick, gummy texture. |
| 4 | Pregelatinized thick-boiling regular corn starch. | 7.2 | Pregelatinized defatted corn starch, 8-F. | 4.8 | Too runny, would not set. |
| 5 | do | 6.0 | do | 6.0 | Do. |
| 6 | Pregelatinized defatted thick-boiling corn starch. | 12.0 | | | Do. |
| 7 | Pregelatinized defatted 8-F corn starch. | 12.0 | | | Do. |
| 8 | Granular preswollen corn starch, 20-F. | 12.0 | | | Gummy texture. |
| 9 | do | 11.0 | | | Do. |
| 10 | do | 10.0 | | | Do. |
| 11 | do | 3.6 | Pregelatinized thick-boiling corn starch. | 8.4 | Too runny, would not set. |
| 12 | do | 6.0 | Pregelatinized modified white milo. | 6.0 | Do. |
| 13 | do | 6.0 | Pregelatinized modified red milo. | 6.0 | Do. |

B. Experimental Samples

| Sample Number | Fluidity of Granular preswollen starch | Fluidity of Defatted starch | Grams, GPS/gms. defatted starch | Weight percent GPS/weight, percent defatted starch | Comments on puddings |
|---|---|---|---|---|---|
| 14 | 30-F | 5-F | 6.0/6.0 | 50/50 | Too runny, would not set. |
| 15 | 30-F | 8-F | 7.2/4.8 | 60/40 | Do. |
| 16 | 30-F | 10-F | 6.0/6.0 | 50/50 | Do. |
| 17 | 30-F | 16-F | 6.0/6.0 | 50/50 | Do. |
| 18 | 30-F | 30-F | 6.0/6.0 | 50/50 | Do. |
| 19 | 25-F | 5-F | 7.2/4.8 | 60/40 | Fairly good gel strength, smooth texture. |
| 20 | 25-F | 8-F | 7.2/4.8 | 60/40 | Do. |

TABLE I.—Continued

| Sample Number | Fluidity of Granular preswollen starch | Fluidity of Defatted starch | Grams, GPS/gms. defatted starch | Weight percent GPS/weight, percent defatted starch | Comments on puddings |
|---|---|---|---|---|---|
| 21 | 25-F | 10-F | 7.2/4.8 | 60/40 | Do. |
| 22 | 25-F | 16-F | 7.2/4.8 | 60/40 | Slightly runny, smooth texture. |
| 23 | 25-F | 30-F | 7.2/4.8 | 60/40 | Too runny, would not set. |
| 24 | 20-F | 5-F | 7.2/4.8 | 60/40 | Firm gel structure, very smooth texture, very good overall appearance. |
| 25 | 20-F | 8-F | 4.8/7.2 | 40/60 | Do. |
| 26 | 20-F | 8-F | 6.0/6.0 | 50/50 | Do. |
| 27 | 20-F | 8-F | 7.2/4.8 | 60/40 | Firm gel structure, very smooth texture, excellent overall appearance, practically indistinguishable from cooked pudding. |
| 28 | 20-F | 8-F | 3.6/8.4 | 30/70 | Fairly good gel strength, slightly runny, very smooth texture, good overall appearance. |
| 29 | 20-F | 8-F | 2.4/9.6 | 20/80 | Somewhat weak gel strength, fairly runny, very smooth texture, fair overall appearance. |
| 30 | 20-F | 8-F | 1.2/10.8 | 10/90 | Weak gel strength, runny. |
| 31 | 20-F | 10-F | 7.2/4.8 | 60/40 | Firm gel structure, very smooth texture, very good overall appearance. |
| 32 | 20-F | 16-F | 7.2/4.8 | 60/40 | Do. |
| 33 | 16-F | 5-F | 6.0/6.0 | 50/50 | Weak gel structure, smooth texture. |
| 34 | 16-F | 8-F | 7.2/4.8 | 60/40 | Do. |
| 35 | 16-F | 10-F | 6.0/6.0 | 50/50 | Do. |
| 36 | 16-F | 10-F | 7.2/4.8 | 60/40 | Do. |
| 37 | 16-F | 16-F | 6.0/6.0 | 50/50 | Do. |
| 38 | 16-F | 30-F | 6.0/6.0 | 50/50 | Too runny, would not set. |
| 39 | 10-F | 5-F | 6.0/6.0 | 50/50 | Do. |
| 40 | 10-F | 10-F | 6.0/6.0 | 50/50 | Do. |
| 41 | 10-F | 16-F | 6.0/6.0 | 50/50 | Do. |
| 42 | 10-F | 16-F | 7.2/4.8 | 60/40 | Do. |
| 43 | 10-F | 30-F | 6.0/6.0 | 50/50 | Do. |
| 44 | 5-F | 5-F | 6.0/6.0 | 50/50 | Do. |
| 45 | 5-F | 10-F | 6.0/6.0 | 50/50 | Do. |
| 46 | 5-F | 16-F | 6.0/6.0 | 50/50 | Do. |
| 47 | 5-F | 30-F | 6.0/6.0 | 50/50 | Do. |
| 48 | 20-F | 8-F | 10.8/1.2 | 90/10 | Slightly runny, smooth texture. |

As can be seen from Table I, starch blends comprising from 20% to 90% granular preswollen starch having a fluidity of from 15 and 25 and from 80% to 10% pregelatinized defatted starch having a fluidity of from 5 to 16 (as exemplified by samples numbers 19–22, 24–29, 31–37, and 48) produced very good instant puddings. These puddings were further characterized by excellent flavor and, because of their smooth texture, mouthing characteristics very similar to or indistinguishable from those of a cooked pudding. In addition, these puddings exhibited no syneresis (i.e. water loss) after standing 24 hours, as contrasted with the commercial instant pudding which showed decided water loss after this period of time.

As will also be noted from Table I, Sample 27, which exemplifies our preferred blend of 60% 20 fluidity granular preswollen starch and 40% 8 fluidity pregelatinized defatted starch, produced a pudding which was practically identical with a cooked pudding.

EXAMPLE II

Example I was repeated using various blends of 20 fluidity granular preswollen starch prepared from the following starches: wheat, rice, waxy sorghum, regular sorghum, rye, barley, oat, waxy maize, high-amylose corn, and 8 fluidity pregelatinized defatted starch made from the same starches with the exception of waxy sorghum and waxy maize. The resulting puddings were comparable to those made from corn starch.

EXAMPLE III

A pudding was prepared in accordance with Example I, using 40% 8 fluidity defatted starch (fat content, 0.1%) and 60% 20 fluidity granular preswollen starch, which had been prepared by defatting a slightly cross-linked corn starch to a fat content of about 0.1%, and then pasting and roll drying the starch. The pudding was rated "excellent" in terms of gel strength, texture and appearance.

The experiment was then repeated except the granular preswollen starch was not defatted. The pudding was comparable to that prepared from the preceding blend except its taste was somewhat inferior.

EXAMPLE IV

A pudding was prepared in accordance with Example I using 60% 20 fluidity granular preswollen starch and 40% of an 8 fluidity corn starch which had been defatted to a bound fat content of about 0.25%. The pudding was acceptable, but the gel structure was somewhat weak, and the pudding was slightly runny.

This example and the preceding one illustrate the fact that the bound fat content of the pregelatinized defatted starch component is important to the strength and structure of the gel of the finished pudding, while the fat content of the granular preswollen starch component affects primarily only the taste.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

We claim:
1. A starch composition suitable for use in the preparation of puddings comprising a blend of the following:
    (a) from about 20% to about 90%, by weight, of a cold-water dispersible starch, the granules of which are substantially completely intact and substantially completely non-birefringent, said starch being further characterized by having a fluidity of from about 15 to about 25, and
    (b) from about 80% to about 10%, by weight, of a pregelatinized starch which has a fluidity of from about 5 to about 16 and which has a bound fat content of less than about 0.3%, said starch being derived from an amylose-containing starch.
2. The composition of claim 1 wherein said cold-water dispersible starch has a fluidity of about 20.
3. The composition of claim 1 wherein said pregelatinized starch has a fluidity of about 8.
4. The composition of claim 1 wherein said cold-water dispersible starch has a bound fat content of less than about 0.3%.
5. The composition of claim 1 wherein said cold-water dispersible starch has a bound fat content of not greater than about 0.15%.
6. The starch composition of claim 1 wherein said pregelatinized starch has a bound fat content of not greater than about 0.15%.

7. The composition of claim 1 wherein said cold-water dispersible starch is present in an amount of about 60% and said pregelatinized starch is present in an amount of about 40%.

8. The composition of claim 1 wherein said cold-water dispersible starch and said pregelatinized starch are prepared from corn starch.

9. A starch composition suitable for use in the preparation of puddings comprising a blend of the following:
   (a) about 60%, by weight, of a cold-water dispersible starch, the granules of which are substantially completely intact and substantially completely non-birefringent, said starch being further characterized by having a fluidity of about 20 and a bound fat content of less than about 0.3%, and
   (b) about 40%, by weight, of a pregelatinized starch which has a fluidity of about 8 and a bound fat content of less than about 0.3%, said starch being derived from an amylose-containing starch.

10. The composition of claim 9 wherein the bound fat content of said cold-water dispersible starch is not more than about 0.15% and the bound fat content of said pregelatinized starch is not more than about 0.15%.

11. A composition which will form a pudding upon the addition thereto of cold milk comprising a blend of flavoring material, sweetening material, coloring material, and, as the thickening and gelling agent, a starch composition in accordance with claim 1.

12. A composition which will form a pudding upon the addition thereto of cold milk comprising a blend of flavoring material, sweetening material, coloring material, and, as the thickening and gelling agent, a starch composition in accordance with claim 9.

13. A composition which will form a pudding upon the addition thereto of cold milk comprising a blend of flavoring material, sweetening material, coloring material, and, as the thickening and gelling agent, a starch composition in accordance with claim 10.

References Cited

UNITED STATES PATENTS

| | | | |
|---|---|---|---|
| 2,280,723 | 4/1942 | Schoch | 127—71 |
| 2,257,599 | 9/1941 | Frischmuth et al. | 99—139 |
| 2,500,179 | 3/1950 | Hinz et al. | 99—139 |
| 2,587,650 | 3/1952 | Rist | 127—71 |
| 3,399,081 | 8/1968 | Bernetti et al. | 127—71 |

RAYMOND N. JONES, Primary Examiner

J. M. HUNTER, Assistant Examiner

U.S. Cl. X.R.

127—71